Aug. 30, 1955  E. W. LARSEN  2,716,449
APPARATUS FOR CUTTING ARTICLES
Filed Jan. 4, 1951  3 Sheets-Sheet 1

INVENTOR
E. W. LARSEN
BY E. F. Kane
ATTORNEY

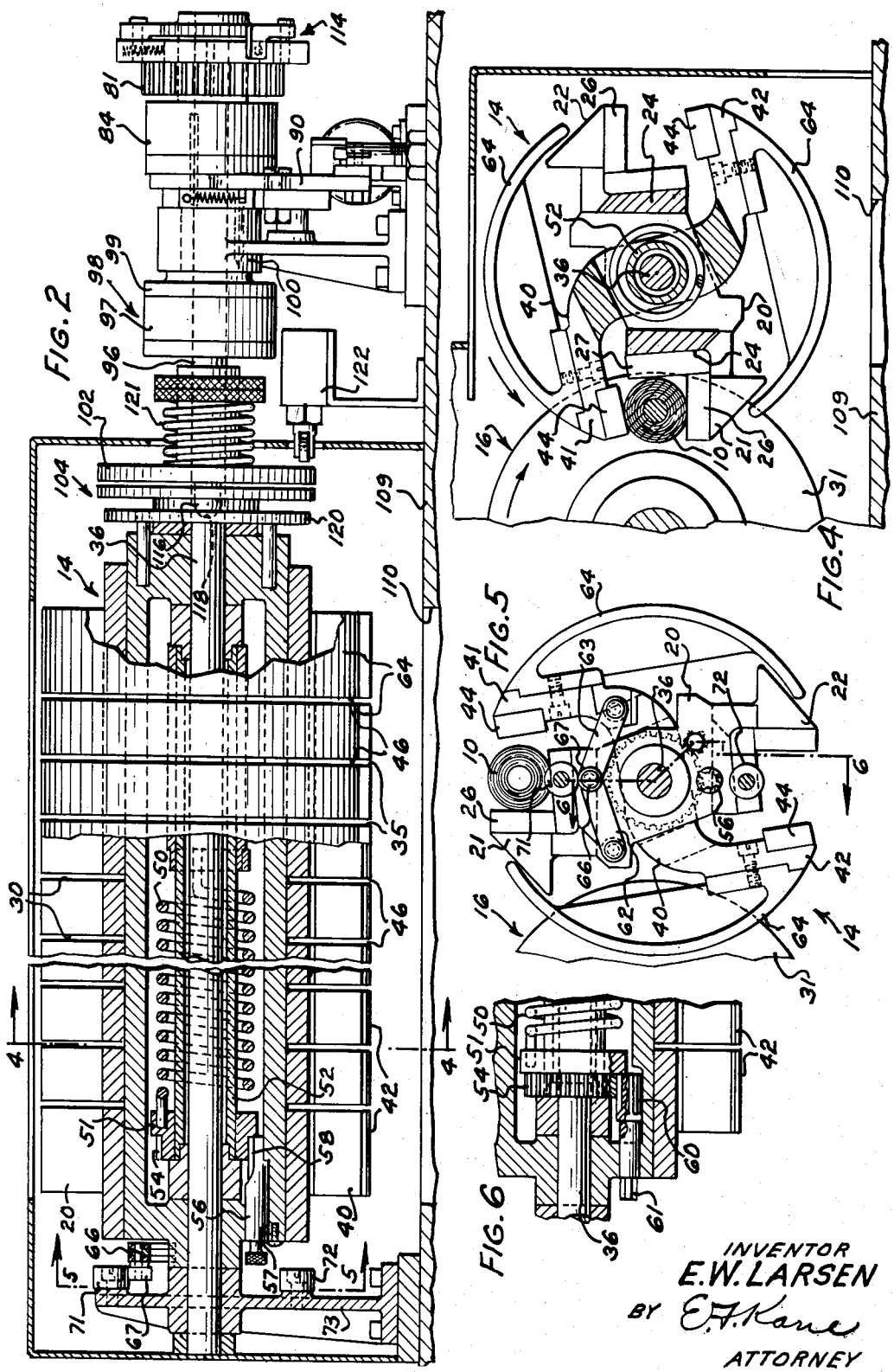

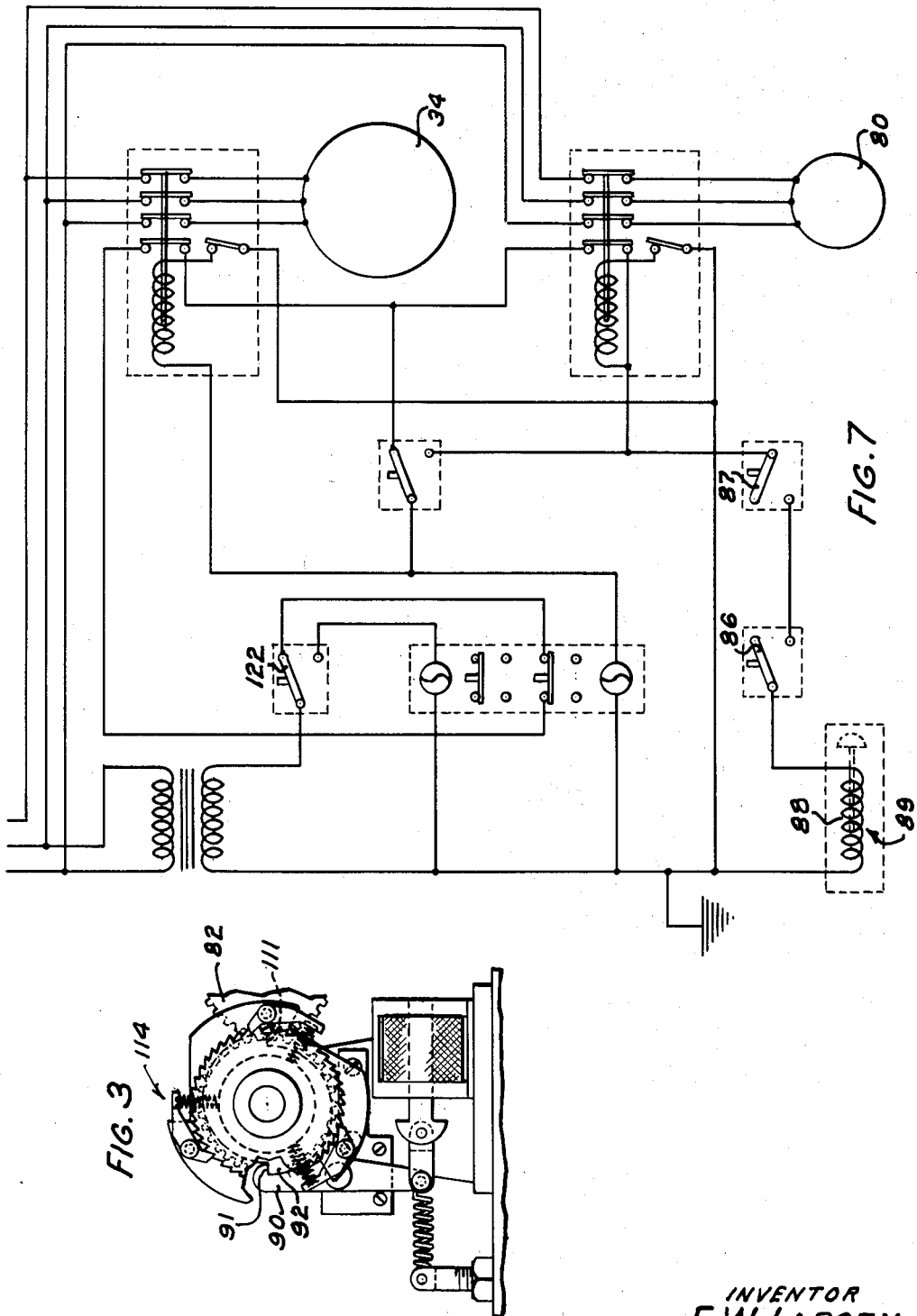

United States Patent Office 2,716,449
Patented Aug. 30, 1955

2,716,449

APPARATUS FOR CUTTING ARTICLES

Einer W. Larsen, Elmhurst, Ill., assignor to Western Electric Company, Incorporated, New York, N. Y., a corporation of New York Application January 4, 1951, Serial No. 204,357

3 Claims. (Cl. 164—61)

This invention relates to apparatus for cutting articles, and more particularly to an apparatus for cutting elongated cylindrical rolls into short lengths.

In the manufacture of coils, a plurality of wires are sometimes wound around longitudinally spaced portions of a mandrel with sheets of insulating material being positioned between adjacent layers of the wires, the resulting structure being in the form of an elongated, thick walled cylindrical tube which then is cut into individual coils. In the past, there has been no satisfactory apparatus for cutting such multi-coil cylindrical rolls into the plurality of short lengths neatly, expeditiously and without considerable handling of the cylindrical rolls.

An object of the invention is to provide new and improved apparatus for cutting articles.

A further object of the invention is to provide new and improved apparatus for cutting multi-coil cylindrical rolls into short lengths.

Another object of the invention is to provide apparatus for automatically gripping a multi-coil cylindrical roll, moving the roll past a series of cutters to cut it into short lengths, moving the lengths past the cutters and dropping the cut lengths into a suitable receptacle.

An apparatus illustrating certain features of the invention may include a series of cutters mounted for rotation about a predetermined axis and spaced apart along that axis, a pair of gripping jaws having clearance slots therein positioned opposite to the cutters for gripping an elongated article, means for moving the jaws toward and away from the cutters to move the article into position to be cut by the cutters and away from the cutters, means operable by movement of the jaws toward the cutters for closing the jaws as the jaws approach the cutters, and means operable by movement of the jaws away from the cutters for opening the jaws.

A complete understanding of the invention may be obtained from the following detailed description of an apparatus forming a specific embodiment thereof, when read in conjunction with the appended drawing, in which:

Fig. 2 is an enlarged, fragmentary, vertical section taken along line 2—2 of Fig. 1;

Fig. 3 is an enlarged, fragmentary, side elevation taken on the line 3—3 of Fig. 1;

Fig. 4 is an enlarged, fragmentary, vertical section taken along the line 4—4 of Fig. 2;

Fig. 5 is an enlarged, fragmentary, vertical section taken along the line 5—5 of Fig. 2;

Fig. 6 is an enlarged, generally vertical section taken along line 6—6 of Fig. 5, and Fig. 7 is a diagrammatic view of a control circuit for the apparatus shown in Fig. 1.

Figure 1:
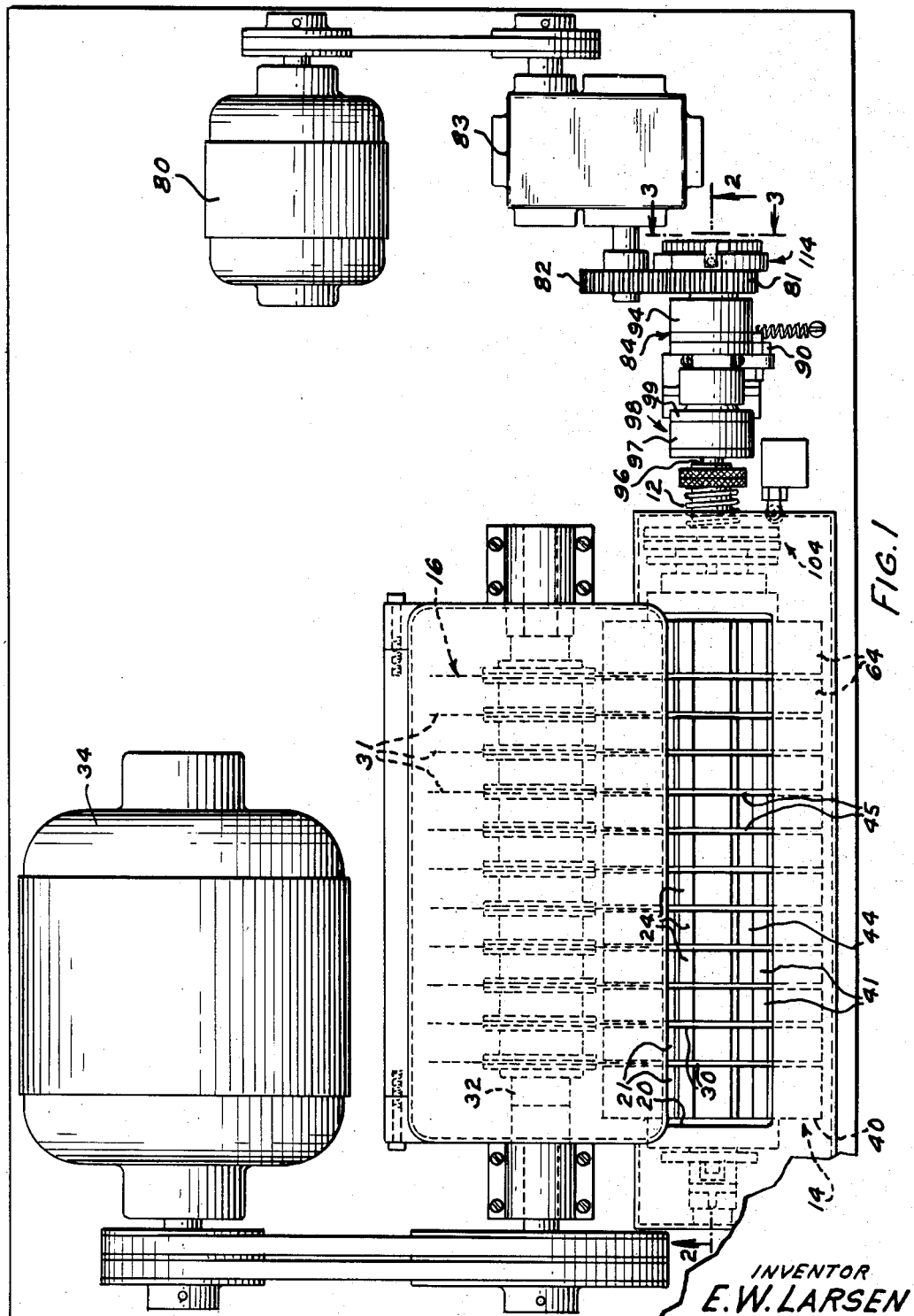
Fig. 1 is a fragmentary, top plan view of an apparatus forming one embodiment of the invention with portions thereof broken away.

Referring now in detail to the drawings, there is shown therein an apparatus for cutting a cylinder 10 of multi-coil length into coil lengths and dropping the coil lengths into a suitable receptacle (not shown). This apparatus includes a work feeding and gripping mechanism 14, which moves the cylinder to a multi-disc cutter 16. The clamping mechanism 14 includes a generally S-shaped clamping element 20 (Figs. 1, 4 and 5) provided with jaws 21—21 and 22—22 at opposite ends thereof, supporting shoulders 24—24, sponge rubber pads 26—26 and 27—27 fastened to the faces of the jaws 21—21 and 22—22 and the shoulders 24—24, respectively. Slots 30—30 between the jaws 21—21 are to provide clearance for circular cutting discs 31—31 (Fig. 1) mounted on a shaft 32 driven continuously by an electric motor 34, and slots 35—35 are provided between the jaws 22—22.

The element 20 is fixed to a shaft 36, and a second generally S-shaped clamping element 40 is rotatable on the shaft 36. The element 40 is provided with jaws 41—41 at one end thereof, and jaws 42—42 at the opposite end thereof. The jaws 41—41 face the jaws 21—21 and are provided with sponge rubber pads 44—44 on the gripping faces, and also have slots 45—45 which are opposite the slots 30—30 between the jaws 21—21. The jaws 42—42 also have the sponge rubber pads 44—44 thereon and slots 46—46 positioned therebetween opposite to the slots 35—35 between the jaws 22—22 of the element 20. One end of a torsion spring 50 is fastened to the element 40, and the other end of the spring is secured to a collar 51 (Fig. 2) rotatable on a sleeve 52. A pinion 54 fastened rigidly to the collar 51 is locked to the element 20 by a pin 56 designed to be mounted against rotation in a socket 57 formed in the element 20. The pin 56 has a gear tooth 58 designed to mesh with the pinion. The spring 50 strongly urges the jaws carried by the elements 20 and 40 toward closed positions, and the force of the spring 50 may be varied by removing the pin 56 and manually turning a pinion 60 (Fig. 6) meshing with the pinion 54 through a bolt head 61 formed integrally with the pinion 60. Then the locking pin 56 is replaced.

Links 62 and 63 (Fig. 5) are connected to the elements 20 and 40, and arcuate guides 64—64 are secured to the jaws 41—41 and 42—42. The links 62 and 63 are connected together by a pin 66 which mounts a follower roller 67 thereon. When the roller 67 is pressed radially inwardly toward the shaft 36, the links 62 and 63 push the clamping elements 20 and 40 to non-clamping positions, and cams 71 and 72 carried by a bearing support 73 press the roller 67 radially whenever the opposing jaws 21—21 and 41—41 face generally upwardly or generally downwardly, as viewed in Fig. 4.

An electric motor 80 (Figs. 1 and 7) continuously energized rotates a gear 81 through a gear 82 and an adjustable transmission 83. The gear 81 drives an inner driving member of a half revolution clutch 84 of conventional design continuously. Whenever palm-operated switches 86 and 87 are closed, a winding 88 of a solenoid 89 is energized to pull a latching lever 90 to releasing position out of a notch 91 formed in a collar 92 fastened rigidly to an actuating sleeve 94 (Fig. 1) of the half revolution clutch. The clutch 84 then drives a shaft 96, which drives a driving clutch member 97 of a one-way clutch 98, which includes another member 99 secured against rotation with respect to a bearing support 100. The shaft 96 rotates a drive plate 102 (Fig. 2) of an overload clutch 104, and drives the shaft 36 through the overload clutch to revolve the S-shaped clamping elements 20 and 40. As the roller 67 is rolled past the cam 71 the spring 50 closes the jaws 21—21 and 41—41 tightly on the multi-coil cylinder 10 positioned therebetween, and carry the cylinder past the cutting discs 31—31. The discs cut the cylinder into coil lengths, and as the cylinder is moved 180° from the position in which it is shown in Fig. 2, it engages the cam 72, which moves the jaws 21—21 and 41—41 to open positions to drop the cut coil lengths on a support 109 having an opening 110. As the roller 67 arrives at this position, the latch 90 drops into a notch 111 (Fig. 3) formed in the collar 92 to stop the clamping elements 20 and 40 in this position to receive another cylinder. A ratchet type one-way clutch 114 prevents overrunning of the shaft 36 by pull of the cutting discs 31—31 on the cylinder 10.

Pins 116—116 (Fig. 2) secured to the plate 102, which is fixed to the shaft 96, are cammed by overload out of sockets 118—118 formed in a plate 120 fastened to the shaft 21 against the action of a compression spring 121, and force the plate 102 into actuating engagement with a limit switch 122. This actuation of the limit switch 122 deenergizes the motors 34 and 80.

Operation

With the apparatus in a loading position, in which the jaws 21—21 and 41—41 are directed upwardly or the jaws 22—22 and 42—42 are directed upwardly, the multi-coil length cylinder 10 is dropped between the open jaws and the palm operated switches 86 and 87 are pressed. This actuates the solenoid 89 to pull the latching lever 90 out of one latching position and the shaft 36 is driven to revolve the cylinder S-shaped clamping elements 20 and 40. Shortly after the revolution begins, the switches 86 and 87 are released and open, thereby dropping out the solenoid 89 to permit the latch 90 to drop into the next occurring notch in the collar 92. As the clamping elements 20 and 22 are revolved, the roller 67 is moved away from the cam 71, and jaws clamp the cylinder 10 tightly therebetween and move the cylinder into engagement with and past the cutting discs 31—31, which cut the cylinder into coil lengths. As the roller 67 comes into engagement with the cam 72 the jaws holding the coil lengths are opened to drop the coil lengths therefrom, and the latch 90 drops into the notch 91 or the notch 111, whichever has come up to the latch. The operation thus described may be repeated for another 180° revolution of the carrier 14 to cut another cylinder, and during this movement the previously cut coil lengths are pushed through the opening 110 into a receptacle (not shown), and may be operated with minimum effort by an operator. Furthermore, there is no danger to the operator operating this machine, inasmuch as all that is necessary for the operator to do is to merely drop multi-coil length cylinders into the clamping elements and press the switches 86 and 87 to start the apparatus for each cylinder.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A cutting apparatus, which comprises a shaft, a plurality of S-shaped members fixed rigidly to the shaft, a pair of jaws having slots therein fixed to opposite ends of said members, a plurality of S-shaped members mounted rotatably on the shaft, a pair of jaws having slots therein fixed to the ends of the rotatably mounted members, a torsion spring fixed to the shaft and to the movably mounted S-shaped members urging the jaws thereon toward the jaws on the fixed S-shaped members, a plurality of cutters mounted at the side of the shaft, means for rotating the shaft to move the jaws past the cutters, the slots providing clearance for the cutters, toggle-joint linkage means connecting said fixed members to said rotatably mounted members for opening the jaws on the members, and cam means for actuating the toggle-joint linkage means every half rotation of the shaft.

2. A cutting apparatus, which comprises a shaft, a pair of transverse members fixed rigidly to the shaft, an elongated jaw having slots therein fixed to the ends of said members, a second pair of transverse members mounted rotatably on the shaft, a second elongated jaw having slots therein fixed to the ends of the second pair of members, a torsion spring fixed to the shaft and to the second pair of members urging the second jaw thereon toward the first jaw on the fixed members, a plurality of cutters mounted at the side of the shaft, means for rotating the shaft to move the jaws past the cutters, the slots providing clearance for the cutters, toggle-joint linkage means connecting said fixed members to said rotatably mounted members for opening the jaws on the members, and cam means for actuating the toggle-joint linkage means every half rotation of the shaft.

3. A cutting apparatus, which comprises a shaft extending horizontally, a pair of slotted jaws carried by and extending along one side of the shaft, a second pair of slotted jaws carried by and extending along the side of the shaft opposite to that of the first jaws, means urging the pairs of jaws toward closed positions, means for opening each pair of jaws when the pairs of jaws are directed vertically, means operable on each actuation thereof for rotating the shaft through an angle of 180° to move the pairs of jaws between the uppermost and the lowermost positions thereof, a plurality of cutters positioned at the same level as and at one side of the shaft for cutting an elongated article held by the pair of jaws being moved from the uppermost position thereof to the lowermost position thereof, and a housing enclosing the cutters, the jaws and the shaft, said housing being provided with a loading slot just above the uppermost position of the jaws and also having a discharge slot just below the lowermost position of the jaws.

References Cited in the file of this patent

UNITED STATES PATENTS

| | | |
|---|---|---|
| 1,546,808 | Straubel | July 21, 1925 |
| 1,569,420 | Clisson | Jan. 12, 1926 |
| 1,813,340 | Conti | July 7, 1931 |
| 2,114,272 | Temple | Apr. 12, 1938 |